(12) United States Patent
Tanaka

(10) Patent No.: US 8,423,299 B2
(45) Date of Patent: Apr. 16, 2013

(54) ESTIMATION SYSTEM FOR CHEMICAL SUBSTANCE INCLUDED IN PART AND ESTIMATION METHOD FOR CHEMICAL SUBSTANCE INCLUDED IN PART

(75) Inventor: Masataka Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 13/021,869

(22) Filed: Feb. 7, 2011

(65) Prior Publication Data
US 2011/0251799 A1 Oct. 13, 2011

(30) Foreign Application Priority Data
Apr. 8, 2010 (JP) ................................ 2010-089129

(51) Int. Cl.
*G06F 19/00* (2011.01)
(52) U.S. Cl.
USPC ............. 702/23; 705/1.1; 705/7.37; 705/7.38
(58) Field of Classification Search ..................... 702/23; 705/1.1, 7.37–7.38
See application file for complete search history.

(56) References Cited

U.S. PATENT DOCUMENTS
2004/0133596 A1 7/2004 Hiroyoshi et al.
2009/0112665 A1* 4/2009 Tanaka et al. ..................... 705/7

FOREIGN PATENT DOCUMENTS
JP 2002-49649 2/2002
JP 2006-059091 3/2006

OTHER PUBLICATIONS
Notice from the European Patent Office dated Oct. 1, 2007 concerning business methods, vol. 30 No. 11, Nov. 1, 2007 pp. 592-593.

* cited by examiner

Primary Examiner — Jonathan C. Teixeira Moffat
Assistant Examiner — Hien Vo
(74) Attorney, Agent, or Firm — Antonelli, Terry, Stout & Kraus, LLP.

(57) ABSTRACT

The present invention accepts attribute information of evaluation subject parts, and judgment standards of parts category by a data acquiring unit; acquires attribute information and chemical substance information relating to a part already inspected; categorizes the relevant attribute information and the relevant chemical substance information to a part group having attribute information of the evaluation subject parts, and a part group not having it; carries out calculation of statistic values of the content rate of a specified chemical substance in each of the parts groups, comparison between difference of said statistic values in each of the parts groups and the relevant judgment standards, and extraction of said attribute information; extracts attribute information and chemical substance information of said parts already inspected, coincident with all of attribute information extracted; and calculates the statistic value such as an average value relating to the content rate of the chemical substance of these parts.

8 Claims, 18 Drawing Sheets

FIG.3

| PARTS ID | PART KIND | MANUFACTURER | PARTS APPLICATIONS |
|----------|-----------|--------------|--------------------|
| A101 | CABLE | A ENTERPRISE | FOR COMMUNICATION |
| A102 | CABLE | A ENTERPRISE | FOR COMMUNICATION |
| A201 | CABLE | A ENTERPRISE | FOR HOME APPLIANCE |
| B101 | CABLE | B ENTERPRISE | FOR COMMUNICATION |
| B201 | CABLE | B ENTERPRISE | FOR HOME APPLIANCE |
| C201 | CONDENSER | C ENTERPRISE | FOR HOME APPLIANCE |
| D201 | CONDENSER | D ENTERPRISE | FOR HOME APPLIANCE |
| E101 | COVER | E ENTERPRISE | FOR COMMUNICATION |
| E201 | COVER | E ENTERPRISE | FOR HOME APPLIANCE |
| ⋮ | | | |

FIG.4

| PARTS ID | USE LOCATION | MATERIAL | MATERIAL ID | CONTENT RATE (ppm) |
|---|---|---|---|---|
| A101 | EXTERNAL SKIN | PVC | CAS01 | 600 |
| A101 | BASE MATERIAL | COPPER | CAS02 | 10 |
| A102 | EXTERNAL SKIN | PVC | CAS01 | 500 |
| A102 | BASE MATERIAL | COPPER | CAS02 | 15 |
| A201 | EXTERNAL SKIN | PVC | CAS01 | 350 |
| A201 | BASE MATERIAL | COPPER | CAS02 | 30 |
| B101 | EXTERNAL SKIN | PVC | CAS01 | 630 |
| B101 | BASE MATERIAL | COPPER | CAS02 | 5 |
| B201 | EXTERNAL SKIN | PVC | CAS01 | 500 |
| B201 | BASE MATERIAL | COPPER | CAS02 | 20 |
| C201 | EXTERNAL SKIN | PVC | CAS01 | 250 |
| C201 | BASE MATERIAL | COPPER | CAS02 | 10 |
| D201 | EXTERNAL SKIN | PVC | CAS01 | 200 |
| D201 | BASE MATERIAL | COPPER | CAS02 | 15 |
| E101 | EXTERNAL SKIN | PVC | CAS01 | 400 |
| E101 | BASE MATERIAL | COPPER | CAS02 | 5 |
| E201 | EXTERNAL SKIN | PVC | CAS01 | 350 |
| E201 | BASE MATERIAL | COPPER | CAS02 | 20 |
| ⋮ | | | | |

FIG.5

| EVALUATION SUBJECT ID | MATERIAL ID | PART ATTRIBUTE NAME | ATTRIBUTE VALUE |
|---|---|---|---|
| 1 | CAS01 | USE LOCATION | EXTERNAL SKIN |
| 1 | CAS01 | MATERIAL | PVC |
| 1 | CAS01 | PART KIND | CABLE |
| 1 | CAS01 | USE APPLICATIONS | FOR COMMUNICATION |
| 2 | CAS02 | PART KIND | CABLE |
| 2 | CAS02 | MANUFACTURER | A ENTERPRISE |
| 2 | CAS02 | USE APPLICATIONS | FOR COMMUNICATION |
| 2 | CAS02 | USE LOCATION | BASE MATERIAL |
| 2 | CAS02 | MATERIAL | COPPER |
| ⋮ | | | |

FIG.6

| PARTS ID | USE LOCATION | MATERIAL | MATERIAL ID | CONTENT RATE (ppm) |
|---|---|---|---|---|
| A100 | EXTERNAL SKIN | PVC | CAS01 | 576.7 |
| A100 | BASE MATERIAL | COPPER | CAS02 | 10 |
| ⋮ | | | | |

FIG.7

■ EVALUATION SUBJECT PARTS

PARTS ID : A100

■ PART ATTRIBUTE INFORMATION

PART KIND : CABLE

MANUFACTURER : A ENTERPRISE

USE APPLICATIONS : FOR COMMUNICATION

COMPOSING MATERIAL :

| USE LOCATION | MATERIAL |
|---|---|
| EXTERNAL SKIN | PVC |
| BASE MATERIAL | COPPER |

ADD

■ PARTS CATEGORY JUDGMENT STANDARD

| APPROVAL RANGE | UNIT |
|---|---|
| 100 | ppm ▼ |

CARRY OUT

FIG.8

■ EVALUATION SUBJECT PARTS

PARTS ID : A100

■ PART ATTRIBUTE INFORMATION

PART KIND : CABLE

MANUFACTURER : A ENTERPRISE

USE APPLICATIONS : FOR COMMUNICATION

COMPOSING MATERIAL :

| USE LOCATION | MATERIAL | MATERIAL ID | CONTENT RATE (ppm) |
|---|---|---|---|
| EXTERNAL SKIN | PVC | CAS01 | 576.7 |
| BASE MATERIAL | COPPER | CAS02 | 10 |

FIG.9

| EVALUATION SUBJECT ID | PART ATTRIBUTE NAME | ATTRIBUTE VALUE |
|---|---|---|
| 1 | PART KIND | CABLE |
| 1 | MANUFACTURER | A ENTERPRISE |
| 1 | USE APPLICATIONS | FOR COMMUNICATION |
| 1 | USE LOCATION | EXTERNAL SKIN |
| 1 | MATERIAL | PVC |
| 2 | PART KIND | CABLE |
| 2 | MANUFACTURER | A ENTERPRISE |
| 2 | USE APPLICATIONS | FOR COMMUNICATION |
| 2 | USE LOCATION | BASE MATERIAL |
| 2 | MATERIAL | COPPER |
| ⋮ | | |

FIG.10

| PARTS GROUP | PARTS ID | PART KIND | MANUFACTURER | PARTS APPLICATIONS |
|---|---|---|---|---|
| A | A101 | CABLE | A ENTERPRISE | FOR COMMUNICATION |
| A | A102 | CABLE | A ENTERPRISE | FOR COMMUNICATION |
| A | A201 | CABLE | A ENTERPRISE | FOR HOME APPLIANCE |
| A | B101 | CABLE | B ENTERPRISE | FOR COMMUNICATION |
| A | B201 | CABLE | B ENTERPRISE | FOR HOME APPLIANCE |
| B | C201 | CONDENSER | C ENTERPRISE | FOR HOME APPLIANCE |
| B | D201 | CONDENSER | D ENTERPRISE | FOR HOME APPLIANCE |
| B | E101 | COVER | E ENTERPRISE | FOR COMMUNICATION |
| B | E201 | COVER | E ENTERPRISE | FOR HOME APPLIANCE |
| ⋮ | | | | |

FIG.11

| PARTS GROUP | PARTS ID | USE LOCATION | MATERIAL | MATERIAL ID | CONTENT RATE (ppm) |
|---|---|---|---|---|---|
| A | A101 | EXTERNAL SKIN | PVC | CAS01 | 600 |
| A | A101 | BASE MATERIAL | COPPER | CAS02 | 10 |
| A | A102 | EXTERNAL SKIN | PVC | CAS01 | 500 |
| A | A102 | BASE MATERIAL | COPPER | CAS02 | 15 |
| A | A201 | EXTERNAL SKIN | PVC | CAS01 | 350 |
| A | A201 | BASE MATERIAL | COPPER | CAS02 | 30 |
| A | B101 | EXTERNAL SKIN | PVC | CAS01 | 630 |
| A | B101 | BASE MATERIAL | COPPER | CAS02 | 5 |
| A | B201 | EXTERNAL SKIN | PVC | CAS01 | 500 |
| A | B201 | BASE MATERIAL | COPPER | CAS02 | 20 |
| B | C201 | EXTERNAL SKIN | PVC | CAS01 | 250 |
| B | C201 | BASE MATERIAL | COPPER | CAS02 | 10 |
| B | D201 | EXTERNAL SKIN | PVC | CAS01 | 200 |
| B | D201 | BASE MATERIAL | COPPER | CAS02 | 15 |
| B | E101 | EXTERNAL SKIN | PVC | CAS01 | 400 |
| B | E101 | BASE MATERIAL | COPPER | CAS02 | 5 |
| B | E201 | EXTERNAL SKIN | PVC | CAS01 | 350 |
| B | E201 | BASE MATERIAL | COPPER | CAS02 | 20 |
| ⋮ | | | | | |

FIG.12

| PARTS GROUP | MATERIAL ID | CONTENT RATE STATISTIC VALUE (ppm) |
|---|---|---|
| A | CAS01 | 516 |
| B | CAS01 | 300 |
| ⋮ | | |

FIG.13

| EVALUATION SUBJECT ID | MATERIAL ID | PART ATTRIBUTE NAME | ATTRIBUTE VALUE | ∣ Ra - Rb ∣ (ppm) |
|---|---|---|---|---|
| 1 | CAS01 | PART KIND | CABLE | 216 |
| ⋮ | | | | |

FIG.14

| PARTS GROUP | PARTS ID | PART KIND | MANUFACTURER | PARTS APPLICATIONS |
|---|---|---|---|---|
| A | A101 | CABLE | A ENTERPRISE | FOR COMMUNICATION |
| A | A102 | CABLE | A ENTERPRISE | FOR COMMUNICATION |
| A | A201 | CABLE | A ENTERPRISE | FOR HOME APPLIANCE |
| B | B101 | CABLE | B ENTERPRISE | FOR COMMUNICATION |
| B | B201 | CABLE | B ENTERPRISE | FOR HOME APPLIANCE |
| B | C201 | CONDENSER | C ENTERPRISE | FOR HOME APPLIANCE |
| B | D201 | CONDENSER | D ENTERPRISE | FOR HOME APPLIANCE |
| B | E101 | COVER | E ENTERPRISE | FOR COMMUNICATION |
| B | E201 | COVER | E ENTERPRISE | FOR HOME APPLIANCE |
| ⋮ | | | | |

FIG.15

| PARTS GROUP | PARTS ID | USE LOCATION | MATERIAL | MATERIAL ID | CONTENT RATE (ppm) |
|---|---|---|---|---|---|
| A | A101 | EXTERNAL SKIN | PVC | CAS01 | 600 |
| A | A101 | BASE MATERIAL | COPPER | CAS02 | 10 |
| A | A102 | EXTERNAL SKIN | PVC | CAS01 | 500 |
| A | A102 | BASE MATERIAL | COPPER | CAS02 | 15 |
| A | A201 | EXTERNAL SKIN | PVC | CAS01 | 350 |
| A | A201 | BASE MATERIAL | COPPER | CAS02 | 30 |
| B | B101 | EXTERNAL SKIN | PVC | CAS01 | 630 |
| B | B101 | BASE MATERIAL | COPPER | CAS02 | 5 |
| B | B201 | EXTERNAL SKIN | PVC | CAS01 | 500 |
| B | B201 | BASE MATERIAL | COPPER | CAS02 | 20 |
| B | C201 | EXTERNAL SKIN | PVC | CAS01 | 250 |
| B | C201 | BASE MATERIAL | COPPER | CAS02 | 10 |
| B | D201 | EXTERNAL SKIN | PVC | CAS01 | 200 |
| B | D201 | BASE MATERIAL | COPPER | CAS02 | 15 |
| B | E101 | EXTERNAL SKIN | PVC | CAS01 | 400 |
| B | E101 | BASE MATERIAL | COPPER | CAS02 | 5 |
| B | E201 | EXTERNAL SKIN | PVC | CAS01 | 350 |
| B | E201 | BASE MATERIAL | COPPER | CAS02 | 20 |
| ⋮ | | | | | |

FIG.16

| PARTS GROUP | MATERIAL ID | CONTENT RATE STATISTIC VALUE (ppm) |
|---|---|---|
| A | CAS01 | 483.3 |
| B | CAS01 | 388.3 |
| ⋮ | | |

FIG.17

| EVALUATION SUBJECT ID | MATERIAL ID | PART ATTRIBUTE NAME | ATTRIBUTE VALUE | \| Ra - Rb \| (ppm) |
|---|---|---|---|---|
| 1 | CAS01 | PART KIND | CABLE | 216 |
| 1 | CAS01 | USE APPLICATIONS | FOR COMMUNICATION | 202.5 |
| 1 | CAS01 | USE LOCATION | EXTERNAL SKIN | 420 |
| 1 | CAS01 | MATERIAL | PVC | 420 |
| ⋮ | | | | |

FIG.18

| PARTS ID | USE LOCATION | MATERIAL | MATERIAL ID | CONTENT RATE (ppm) |
|---|---|---|---|---|
| A101 | EXTERNAL SKIN | PVC | CAS01 | 600 |
| A102 | EXTERNAL SKIN | PVC | CAS01 | 500 |
| A201 | EXTERNAL SKIN | PVC | CAS01 | 350 |
| B101 | EXTERNAL SKIN | PVC | CAS01 | 630 |
| B201 | EXTERNAL SKIN | PVC | CAS01 | 500 |
| C201 | EXTERNAL SKIN | PVC | CAS01 | 250 |
| D201 | EXTERNAL SKIN | PVC | CAS01 | 200 |
| E101 | EXTERNAL SKIN | PVC | CAS01 | 400 |
| E201 | EXTERNAL SKIN | PVC | CAS01 | 350 |
| ⋮ | | | | |

FIG.19

| EVALUATION SUBJECT ID | MATERIAL ID | PART ATTRIBUTE NAME | ATTRIBUTE VALUE | \| Ra − Rb \| (ppm) |
|---|---|---|---|---|
| 1 | CAS01 | PART KIND | CABLE | 216 |
| 1 | CAS01 | USE APPLICATIONS | FOR COMMUNICATION | 202.5 |
| 1 | CAS01 | MATERIAL | PVC | 420 |
| ⋮ | | | | |

FIG.20

| EVALUATION SUBJECT ID | MATERIAL ID | PART ATTRIBUTE NAME | ATTRIBUTE VALUE | \| Ra - Rb \| (ppm) |
|---|---|---|---|---|
| 1 | CAS01 | PART KIND | CABLE | 216 |
| 1 | CAS01 | USE APPLICATIONS | FOR COMMUNICATION | 202.5 |
| ⋮ | | | | |

FIG.21

| EVALUATION SUBJECT ID | MATERIAL ID | PART ATTRIBUTE NAME | ATTRIBUTE VALUE | \| Ra - Rb \| (ppm) |
|---|---|---|---|---|
| 1 | CAS01 | USE APPLICATIONS | FOR COMMUNICATION | 151.7 |
| ⋮ | | | | |

FIG.22

| PARTS ID | PART KIND | MANUFACTURER | PARTS APPLICATIONS |
|---|---|---|---|
| A101 | CABLE | A ENTERPRISE | FOR COMMUNICATION |
| A102 | CABLE | A ENTERPRISE | FOR COMMUNICATION |
| B101 | CABLE | B ENTERPRISE | FOR HOME APPLIANCE |
| ⋮ | | | |

FIG.23

| PARTS ID | USE LOCATION | MATERIAL | MATERIAL ID | CONTENT RATE (ppm) |
|---|---|---|---|---|
| A101 | EXTERNAL SKIN | PVC | CAS01 | 600 |
| A102 | EXTERNAL SKIN | PVC | CAS01 | 500 |
| B101 | EXTERNAL SKIN | PVC | CAS01 | 630 |
| ⋮ | | | | |

FIG.24

| PARTS GROUP | PARTS ID | PART KIND | MANUFACTURER | PARTS APPLICATIONS |
|---|---|---|---|---|
| A | A101 | CABLE | A ENTERPRISE | FOR COMMUNICATION |
| A | A102 | CABLE | A ENTERPRISE | FOR COMMUNICATION |
| B | B101 | CABLE | B ENTERPRISE | FOR COMMUNICATION |
| ⋮ | | | | |

FIG.25

| PARTS GROUP | PARTS ID | USE LOCATION | MATERIAL | MATERIAL ID | CONTENT RATE (ppm) |
|---|---|---|---|---|---|
| A | A101 | EXTERNAL SKIN | PVC | CAS01 | 600 |
| A | A102 | EXTERNAL SKIN | PVC | CAS01 | 500 |
| B | B101 | EXTERNAL SKIN | PVC | CAS01 | 630 |
| ⋮ | | | | | |

FIG.26

| PARTS GROUP | MATERIAL ID | CONTENT RATE STATISTIC VALUE (ppm) |
|---|---|---|
| A | CAS01 | 550 |
| B | CAS01 | 630 |
| ⋮ | | |

ESTIMATION SYSTEM FOR CHEMICAL SUBSTANCE INCLUDED IN PART AND ESTIMATION METHOD FOR CHEMICAL SUBSTANCE INCLUDED IN PART

INCORPORATION BY REFERENCE

The present application claims priority from Japanese application JP2010-08129 filed on Apr. 8, 2010, the content of which is hereby incorporated by reference into this application.

BACKGROUND OF THE INVENTION

The present invention relates to a system for managing information of a chemical substance, in particular, the present invention relates to a system for estimating the chemical substance included in the parts for compliance with limitation of a specified chemical substance included in the parts, or restriction such as obligation of information transmission relating to the specified chemical substance, and a method for estimating the chemical substance included in the parts.

In recent years, environmental restrictions have been strengthened in each country, and for example, there is RoHS (Restriction of the use of certain Hazardous Substance in electrical and electronic equipment) directive, or REACH (Registration Evaluation Authorization and Restriction of Chemicals) restriction or the like established in Europe. RoHS is a restriction to forbid containment of the specified chemical substance in electrical and electronic equipment, while REACH is a restriction to make obligation of information transmission of the specified chemical substance included in a product. To comply with these restrictions, it is necessary to exchange, without delay, information on the chemical substance included in the parts which each enterprise sells, over the whole supply chain (hereafter referred to as SC). However, in carrying out countermeasure for these restrictions, there is a problem of defectiveness such as error, missing in chemical substance information to be exchanged between enterprises, or tremendous increase in man-hour to confirm this defectiveness, or delay of collecting the chemical substance information, which makes delayed countermeasure to obligation of information transmission to the users.

Under these circumstances, as a method for evaluating containment possibility of a restriction subject material in the parts, there have conventionally been the methods described in the following JP-A-2006-59091 and JP-A-2002-49649 (Patent Document 1 and 2) and the like.

The former method is one for defining a containment possibility rank of the restriction subject material for every material composing the parts, and displaying the containment possibility of these chemical substances in selecting the parts to be purchased. According to this method, it is possible to color mark on the containment possibility rank of the chemical substance such as lead, cadmium specified by RoHS, for each elemental material composing the parts, such as plating, solder, a resin, and display in a matrix. In this way, because of enabling to narrow down an element material with high probability of containing the restriction subject material in inspection thereof, it is possible to countermeasure to the above restrictions efficiently.

In addition, the latter method is one, even in the case of insufficient information on the restriction subject material of a certain parts, for evaluating the chemical substance information in the relevant parts, by averaging processing of the chemical substance information of the same grade or material collected by an existing chemical substance database. According to this method, it is possible to evaluate the chemical substance information included, even for the parts which generate delay in information collection as above, by averaging processing of part chemical substance information of the same grade for electric parts, while by summing up of the average values of chemical substance information of the same material, plating, coating for mechanical parts.

SUMMARY OF THE INVENTION

In the restriction such as the above RoHS or REACH, the restriction subject chemical substances may be added sequentially by revision of laws or the like. Therefore, each enterprise is required to countermeasure to the restriction by inspecting the parts and products it purchases or sells by itself, at every addition of these restriction subject chemical substances.

However, in the method described in the above Patent Document 1, because it is necessary to define the containment possibility rank by manual inspection of the containment possibility of the restriction subject material of every elemental material, there is a problem of tremendous man-hour required in the above definition, in the case where there are present many combinations of the elemental material and the restriction subject material, as well as requiring special knowledge.

In addition, although the method described in the above Patent Document 2 is capable of evaluating the restriction subject material utilizing the existing chemical substance information, because information to be used in evaluation of the chemical substance information is limited to the same kind or material and the like, the evaluation becomes impossible in the case where the containment possibility of the restriction subject material depends on other factors such as the part kind or manufacturer.

Accordingly, it is an object of the present invention to provide, as for a system for managing information of a chemical substance included, in particular, a method for estimating efficiently the chemical substance included in the parts for compliance with limitation of a specified chemical substance included in the parts, or restriction such as obligation of information transmission relating to the specified chemical substance, even in the case where there was addition of the restriction subject material, or in the case where the containment possibility of the relevant substance is determined by various factors, and a system thereof.

To solve the above problem, the present invention provides, as a system for estimating a content rate or a content amount of a specified chemical substance included in a part coming in and going out from an enterprise, a system for estimating the chemical substance included in the part provided with: a unit for accepting an evaluation subject parts ID, attribute information showing characteristics of the parts, and judgment standards of parts category, from a user; a unit for acquiring attribute information relating to a part already inspected, and chemical substance information on the relevant parts from an external system or a memory unit; a unit for categorizing the attribute information and the chemical substance information of the parts already inspected to a part group having one attribute information specified of the evaluation subject parts accepted, and a part group not having it; a unit for calculating a statistic value of the content rate of a specified chemical substance specified by the chemical substance information of the parts already inspected, in each of the parts groups; a unit for carrying out, comparison between difference of the relevant statistic value in each of the parts groups and the judgment standards of the parts category, adoption of the attribute information specified as a part category specification candidate, in the case where the difference of the relevant statistic value is larger than the judgment standards of the parts category, along with categorization of each of the parts groups, calculation of the statistic value, comparison with the judgment standards and addition of the attribute information to a part category specification candidate list, for all of the attribute information of the evaluation subject parts accepted; a unit for carrying out, adoption of one having the maximum difference of the statistic value as the parts category specification information, among part attributes of the parts category specification candidate list, along with narrow down of the attribute information and the chemical substance information of the parts already inspected, based on the attribute information of the parts category specification information, categorization of each of the parts groups, calculation of the statistic value, comparison with the judgment standards, addition of the attribute information to the parts category specification candidate list, and addition of the parts category specification information, for all of the attribute information of the evaluation subject parts; a unit for extracting attribute information and chemical substance information of the parts already inspected, coincident with all of attribute information of the parts category specification information; a unit for calculating the statistic value of the content rate of the specified chemical substance, in the parts already inspected which were extracted in the above; and a unit for displaying the calculation result on a display device, corresponding to every composing material of the evaluation subject parts.

The system for estimating the chemical substance included in the part accepts at least one among kind, manufacturer, use applications, use location of the composing material and material kind of the relevant parts, as the attribute information of the parts acquired from an external system and/or a memory unit via an input-output unit, from a user.

In addition, the system for estimating the chemical substance included in the part uses at least one among average value, maximum value, minimum value, median, variance and standard deviation, as the statistic value of the content rate of the specified chemical substance in each of the parts groups.

The system for estimating the chemical substance included in the part is further provided with a unit for adding all of the attribute information of the evaluation subject parts, to the parts category specification information, in the case where any one of the attribute information is not listed up in the parts category specification information of the evaluation subject parts.

In addition, the system for estimating the chemical substance included in the part has at least one or more data items of the composing material of the attribute information of the evaluation subject parts, which are accepted from a user, are present, and the statistic value of the content rate of the specified chemical substance in the parts already inspected is calculated for every evaluation subject ID, by putting the evaluation subject ID to every data item of each composing material.

In addition, the system for estimating the chemical substance included in the part estimates the content amount of the chemical substance included in the above evaluation subject parts, by acquiring the content amount of the chemical substance in addition to the chemical substance information of the parts already inspected, instead of the content rate of the specified chemical substance.

According to the present invention, even in the case where there was addition of the restriction subject material, or in the case where the containment possibility of the relevant substance is determined by various factors, it is possible to specify the attribute information of the parts relating to containment possibility of the restriction subject material by utilization of the existing chemical substance information. In this way, even in the above case, it is possible to inspect and countermeasure the chemical substance information of the parts preferentially from a material with higher containment possibility of the restriction subject material, and thus reduce countermeasure man-hour to these restrictions.

Other objects, features and advantages of the invention will become apparent from the following description of the embodiments of the invention taken in conjunction with the accompanying drawings.

BRIEF DESCRIPTION OF THE DRAWINGS

FIG. 3 is a drawing showing one example of part attribute information.

FIG. 4 is a drawing showing one example of part chemical substance information.

FIG. 5 is a drawing showing one example of parts category specification information.

FIG. 6 is a drawing showing one example of part chemical substance estimation result information.

FIG. 7 is a drawing showing one example of an input screen in an Example of the present invention.

FIG. 8 is a drawing showing one example of an output screen in an Example of the present invention.

FIG. 9 is a drawing showing one example of attribute information of the evaluation subject parts in an Example of the present invention.

FIG. 10 is a drawing showing one example of information of part attribute information already inspected in an Example of the present invention, categorized by part kind "cable".

FIG. 11 is a drawing showing one example of information of part chemical substance information already inspected in an Example of the present invention, categorized by part kind "cable".

FIG. 12 is a drawing showing an average value of the chemical substance content rates by parts group categorized by part kind "cable" in an Example of the present invention.

FIG. 13 is a drawing showing one example of a part category specification candidate list in an Example of the present invention.

FIG. 14 is a drawing showing one example of part attribute information already inspected in an Example of the present invention, categorized by the manufacturer, "A company".

FIG. 15 is a drawing showing one example of the part chemical substance information already inspected in an Example of the present invention, categorized by the manufacturer, "A company".

FIG. 16 is a drawing showing an average value of the chemical substance content rates by each parts group, categorized by the manufacturer, "A company" in an Example of the present invention.

FIG. 17 is a drawing showing one example of a part category specification candidate list in the first time processing in an Example of the present invention.

FIG. 18 is a drawing showing one example of the part chemical substance information after the first and the second processing in an Example of the present invention.

FIG. 19 is a drawing showing one example of the parts category specification candidate list in the second time processing in an Example of the present invention.

FIG. 20 is a drawing showing one example of the parts category specification candidate list in the third time processing in an Example of the present invention.

FIG. 21 is a drawing showing one example of the parts category specification candidate list in the fourth time processing in an Example of the present invention.

FIG. 22 is a drawing showing one example of the part attribute information after the fourth time processing in an Example of the present invention.

FIG. 23 is a drawing showing one example of the part chemical substance information after the fourth processing in an Example of the present invention.

FIG. 24 is a drawing showing one example of the part attribute information already inspected in the fifth time processing in an Example of the present invention.

FIG. 25 is a drawing showing one example of the part chemical substance information already inspected in the fifth time processing in an Example of the present invention.

FIG. 26 is a drawing showing an average value of the chemical substance content rates by each parts group, categorized by the manufacturer "A company" in the fifth time processing in an Example of the present invention.

DETAILED DESCRIPTION OF THE INVENTION

Explanation will be given below on a method for attaining the present invention with reference to drawings.

Figure 1:
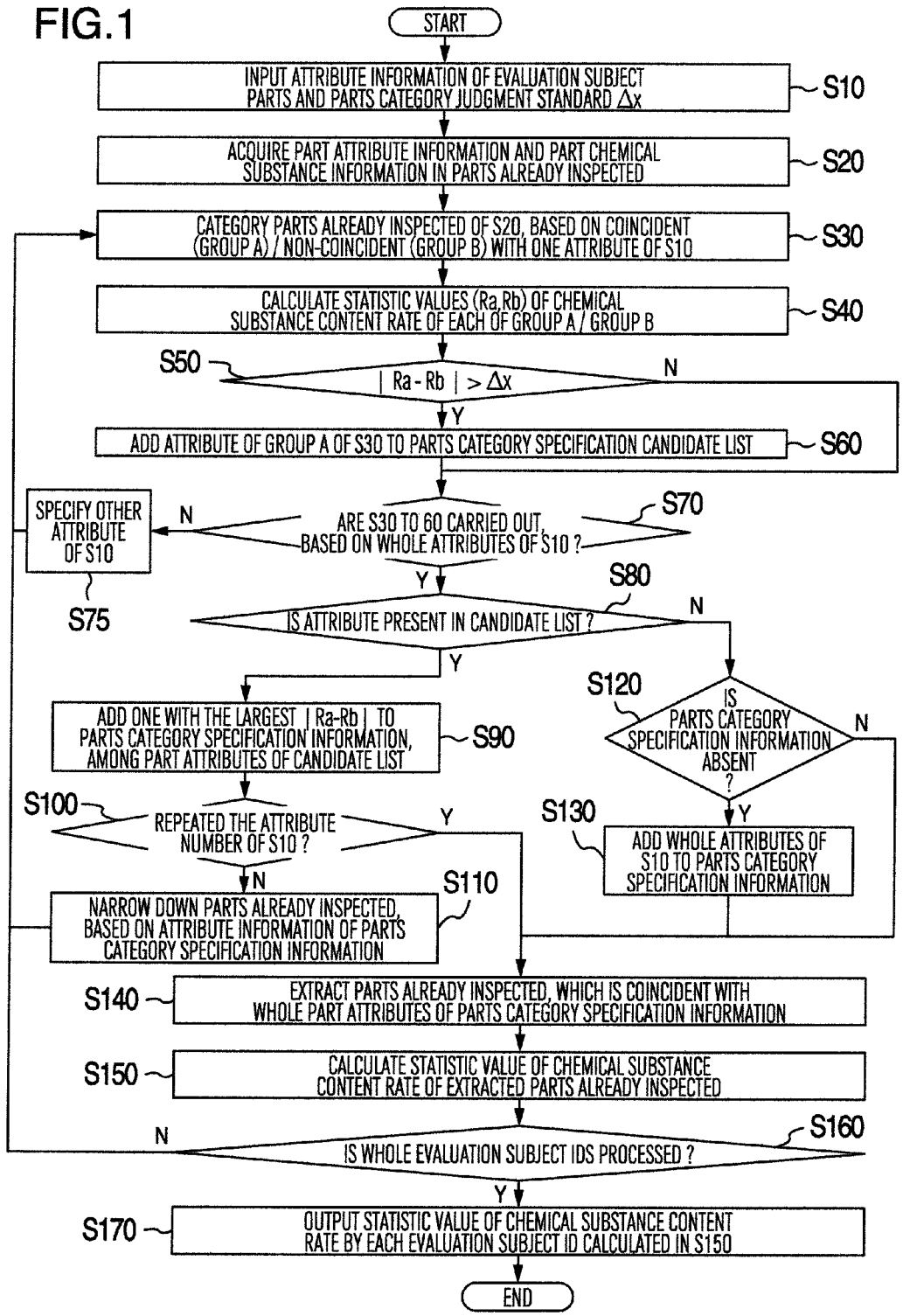
FIG. 1 is a drawing showing one example of a processing flow in an Example of the present invention.
Figure 2:
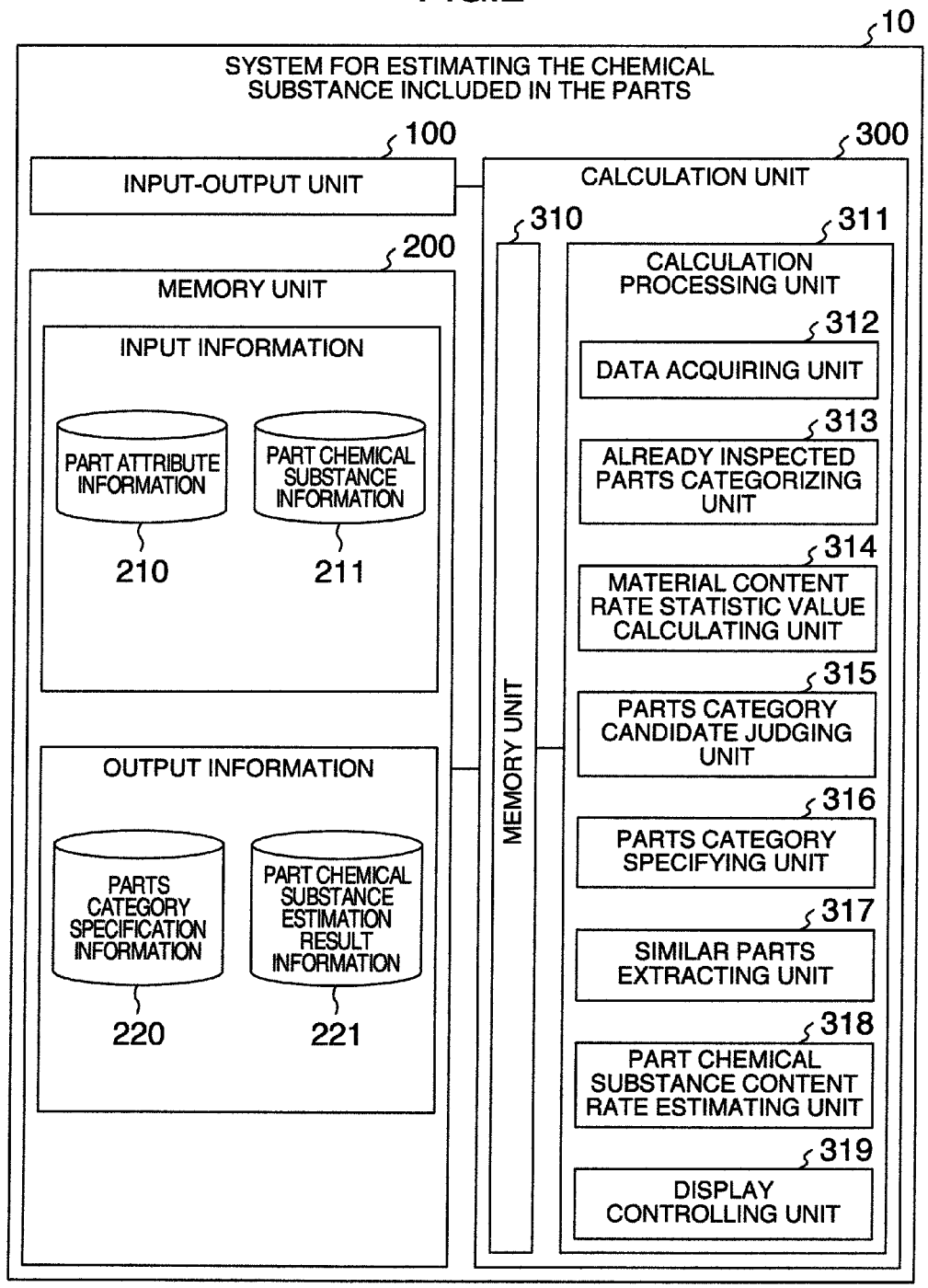
FIG. 2 is a block diagram showing the whole system configuration relating to the present invention.

FIG. 1 shows one example of a processing flow in the present Example, and FIG. 2 is a functional block diagram showing the system configuration of the present Example.

In FIG. 2, a system 10 for estimating the chemical substance included in the part is a PC such as a server or a terminal which a solution vender providing service or a user and the like has, and a system to be mounted to the relevant PC, and is provided with an input-output unit 100, a memory unit 200 and a calculation unit 300.

The input-output unit 100 is one for acquiring data necessary in processing of the calculation unit 300, and for displaying the processed result, and is composed by having, for example, an input device such as a key board or a mouse, a communication device for communicating with the outside, a record playback device of a disk-type memory medium, and an output device such as a CRT or a liquid crystal monitor.

The memory unit 200 stores part attributes information 210 and part chemical substance information 211, which are input information to the calculation unit 300, and is composed of a memory device such as a hard disk drive, a memory.

The part attribute information 210 is information for managing characteristics and the like of parts already designed or produced at each enterprise, and is composed of, for example, as shown in FIG. 3, information on a part ID, a part kind, a manufacturer, and parts applications. In the part attribute information 210 of FIG. 3, for example, a data of the parts ID, "A101", shows to be the parts, where the part kind is categorized as a "cable, the manufacturer is an "A company", and used in the application "for communication".

The part chemical substance information 211 is information on a chemical substance included in a part collected from a supplier by each enterprise, and is composed of, for example, as shown in FIG. 4, information on a part ID, a use location, a material, a material ID, and a content rate. In the part chemical substance information 211 of FIG. 4, for example, a data of the parts ID "A101" and the use location "external skin" shows that a material used in the relevant parts and location is "PVC", and contains the chemical substance of the material ID, "CAS01" in the relevant material, in a ratio of "600 ppm".

Parts category specification information 220 is information for retaining a combination of the part attribute information to be used in estimating the chemical substance information of the evaluation subject parts, inputted from the input screen as shown in FIG. 7 (to be described later), and is composed of, for example, as shown in FIG. 5, information on an evaluation subject ID, a material ID, a part attribute name, and information of an attribute value. In the parts category specification information 220 of FIG. 5, in order to estimate the chemical substance included in the parts, for example, having the evaluation subject ID, "1", it is shown that the chemical substance information of the parts having "external skin", "PVC", "cable" and "for communication," as a value of the part attribute, "use location", "material", "part kind" and "use applications", respectively, is used for the material ID, "CAS01".

Part chemical substance estimation result information 221 is information for displaying estimation result of the chemical substance included in the part on such an output screen as shown in FIG. 8 (to be described later), and is composed of, for example, as shown in FIG. 6, information on a part ID, a use location, a material, a material ID and a content rate. In the part chemical substance estimation result information 221 of FIG. 6, a data of the parts ID, "A101", and the use location, "external skin", shows that a material, "PVC", of the relevant parts and location includes the chemical substance of the material ID, "CAS01", in a ratio of "576.7 ppm".

The calculation unit 300 is provided with function to acquire a data necessary in calculation by the input-output unit 100 or the memory unit 200, and output the processing result to the memory unit 200, and is composed of a calculation processing unit 311 for practically carrying out the calculation processing, and a memory unit 310 as a work area of the calculation processing in the calculation processing unit 311.

The calculation processing unit 311 is composed of a data acquiring unit 312 for acquiring the data necessary in calculation from the input-output unit 100 or the memory unit 200; an already inspected parts categorizing unit 313 for categorizing information relating to the parts already inspected, based on attribute information of the evaluation subject parts which the data acquiring unit 312 acquired from the input-output unit 100, the part attribute information 210 relating to the parts already inspected, and the part chemical substance information 211, to one having certain attribute information of the relevant evaluation subject parts, and one not having it; a material content rate statistic value calculating unit 314 for calculating each statistic value (an average value or the like) or the like of the chemical substance content rate of the parts in each parts group categorized in the above; a part category candidate judging unit 315 for comparing difference of the statistic value of the chemical substance content rate in each of the parts group calculated in the above, with parts category judgment standard (to be described later) inputted by the input-output unit 100, and judging whether the relevant attribute information should be stored or not in the memory unit 310 as a candidate of information for parts category specification; a part category specifying unit 316 for selecting information for parts category specification among candidates of attribute information stored in the memory unit 310 in the above, and storing it in the parts category specification information 220; a similar parts extracting unit 317 for extracting one having the attribute information (similar parts) selected in the above, from the part attribute information 210 and part chemical substance information 211; a part chemical substance content rate estimating unit 318 storing it to the part chemical substance estimation result information 221 by calculating the statistic value of the chemical substance information in the similar parts extracted in the above; and a display controlling unit 319 for displaying the parts category specification information 220 and the part chemical substance estimation result information 221 stored above on the input-output unit 100.

The memory unit 310 is one for temporarily retaining a data which the data acquiring unit 312 acquired from the input-output unit 100 or the memory unit 200, or result processed at the calculation processing unit 311.

Explanation will be given next on action of each function in the system estimating the chemical substance included in the parts 100 of FIG. 2, according to the flow chart of FIG. 1.

First of all, the data acquiring unit 312 accepts the attribute information of the evaluation subject parts and standard $\Delta x$ (to be described later) in judging the parts category inputted from the input-output unit 100 such as a terminal by a user, and stores the relevant attribute information and $\Delta x$ in the memory unit 310 (S10). The user can start processing at the estimation system 10 for chemical substance included in the part, by inputting a part ID of the evaluation subject or information on a kind, a manufacturer, applications or a composing material of the relevant parts, as part attribute information and the standard $\Delta x$, which is a tolerance in judging the parts category to be described later, for example, from an input screen as shown in FIG. 7, and clicking a carrying out button. In the present Example, as shown in FIG. 7, explanation will be given below on the case where there are inputted a part ID "A100"; a part kind "cable", a manufacturer "A company", use applications "for communication" and a use location of a composition material "external skin", "base material", as part attribute information, and a material for each use location "PVC", "copper"; and "100 ppm" as the parts category judgment standard ($\Delta x$). In this time, the evaluation subject part of FIG. 7 shows to be composed of two kinds of composing materials, and because it is necessary to estimate the chemical substance included in each material, two kinds of part attribute information as evaluation subjects are prepared, as shown in FIG. 9, to furnish the evaluation subject ID and they are stored in the memory unit 310. Here, firstly, the following processing is carried out for part attribute information of the evaluation subject ID, "1", shown in FIG. 9.

Next, the data acquiring unit 312 acquires the part attribute information 210 relating to the parts already inspected, and the part chemical substance information 211 from the external system such as a supplier or the memory unit 200, and stores them in the memory unit 310 (S20). In the present Example, explanation will be given below on the case where the part attribute information 210 the part chemical substance information 211, shown in FIGS. 3 and 4, respectively, were acquired.

Subsequently, the already inspected parts categorizing unit 313 categorizes the part attribute information 210 and the part chemical substance information 211 stored in the memory unit 310 in the above, to one having (group A) and not having (group B) certain attribute information in the evaluation subject parts inputted by a user in the above (S30). That is, they are categorized to the group A having a coincident part attribute value, and the group B having a non-coincident part attribute value. For example, when the part attribute information 210 and the part chemical substance information 211 are categorized based on the part kind, "cable", among part attribute information inputted by the user, in FIG. 7, the parts IDs, "A101", "A102", "A201", "B101" and "B201" become the group A, and other parts IDs become the B group, as shown in FIGS. 10 and 11, respectively.

After that, the material content rate statistic value calculating unit 314 calculates the statistic value of the chemical substance content rate of the parts in each of the group A and the group B categorized in the above, and stores them in the memory unit 310 (S40). Explanation will be given here on the case where, provided that the statistic values of the chemical substance content rate for the group A and group B are Ra, and Rb, the statistic value is adopted as average value in the present Example. In this time, calculation of the average value of the chemical substance content rate every parts group, as for the part chemical substance information shown in FIG. 11, gives the result as shown in FIG. 12, and Ra=516 (ppm), and Rb=300 (ppm) for the material ID "CAS01".

It should be noted that, explanation will be given below on an example of calculating the average value as the statistic value of the chemical substance content rate of the parts in the present Example, however, other than this, maximum value, minimum value, median, variance and standard deviation or the like is considered, as the statistic value of the content rate of the specified chemical substance of the parts group.

Next, the parts category candidate judging unit 315 compares an absolute value of difference between Ra and Rb with the parts category judgment standard $\Delta x$ stored in the memory unit 310 (S50), and when the $\Delta x$ is smaller, adds the relevant attribute information to the parts category specification candidate list (S60). For example, as for the material ID "CAS01", shown in FIG. 12, it gives |Ra−Rb|=216 (ppm) >$\Delta x$=100 (ppm), and as shown in FIG. 13, the part attribute name, "part kind", the attribute value, "cable" and |Ra−Rb|, "216 (ppm)", used in categorizing to the group A and group B, are stored in the parts category specification candidate list. This shows presence of relation between the part attribute name, "part kind", the attribute value, "cable" and the material ID, "CAS01". Here, because processing of S30 to S60 has not been carried out on the whole attributes inputted in S10, other certain part attribute is specified to return to processing of S30 (S70).

And, the already inspected parts categorizing unit 313 categorizes the part attribute information 210 and the part chemical substance information 211 for other specified relevant part attributes, similarly as above, to the group A and the group B (S30). Here, when the part attribute information 210 and the part chemical substance information 211 are categorized based on the part attribute name "manufacturer" and the attribute value "A company", shown in FIG. 9, the parts IDs, "A101", "A102" and "A201" become the group A, and other parts IDs become the B group, as shown in FIGS. 14 and 15, respectively.

After that, the material content rate statistic value calculating unit 314 calculates the statistic value of the chemical substance content rate of the parts in each of the group A and group B categorized in the above, and stores them in the memory unit 310 (S40). In this time, calculation of the average values of the chemical substance content rate by each parts group, as for the part chemical substance information shown in FIG. 15, gives the result as shown in FIG. 16, and Ra=483.3 (ppm), and Rb=388.3 (ppm) for the material ID, "CAS01".

Next, the parts category candidate judging unit 315 compares an absolute value of difference between Ra and Rb with the parts category judgment standard $\Delta x$ stored in the memory unit 310 (S50), and when the $\Delta x$ is smaller, adds the relevant attribute information to the parts category specification candidate list (S60). As for the material ID "CAS01", shown in FIG. 16, because it gives |Ra−Rb|=95 (ppm)≦$\Delta x$=100

(ppm), judgment processing is carried out whether categorization has been completed or not, by the whole part attributes of S10 in S30 (S70), without adding the relevant part attribute information to the parts category specification candidate list. In the case where it has not been completed by the whole part attributes, other part attribute is specified, and the step returns to processing of S30 (S75).

Hereafter, when processing S30 to S60 for the whole attributes inputted in S10 is carried out, the parts category specification candidate list shown in FIG. 17, is formed.

And, the parts category specifying unit 316 judges whether the part attribute information is present or not in the parts category specification candidate list (S80), and when it is present, adds one with the largest |Ra−Rb| to the parts category specification information 220, among the part attribute information of the relevant list (S90). For example, in the part attribute information shown in the parts category specification candidate list of FIG. 17, the part attribute name, "use location" (or "material") and the attribute name, "external skin" (or "PVC"), having the largest |Ra−Rb|, for the material ID, "CAS01" are extracted, and are added to the parts category specification information 220, as shown in the first record of FIG. 5. Here, in the case where addition number (i) of the parts category specification information does not satisfy kind number (n) of the part attribute information inputted in S10, the part attribute information 210 and the part chemical substance information 211 acquired in S20 are narrowed down, based on the parts category specification information 220, and returns to processing of S30 (S110). Here, because i=1 and n=5, the step returns to processing of S110, and the part attribute information 210 and the part chemical substance information 211 shown in FIGS. 3 and 4 are narrowed down, based on the part attribute name, "use location", and the attribute value, "external skin", resulting in FIG. 3 (no change) and FIG. 18.

Still more, by repeating processing of S30 to S70 in the second to the fourth times, the parts category specification candidate list, shown in the order of FIGS. 19 to 21, is prepared and because the part attribute information is present in the relevant list (S80), the part attribute name, "material", "part kind", "use applications", the attribute name, "PVC", "cable", "for communication", having the largest |Ra−Rb| in each of FIGS. 19 to 21, are extracted in the order, and each one is added to the parts category specification information 220, as shown in the second to the fourth records of FIG. 5 (S90). Here, because addition number (i=2 to 4) of the parts category specification information does not satisfy kind number (n=5) of the attribute information inputted in S10, the step proceeds to processing of S110 (S100). And, the part attribute information 210 and the part chemical substance information 211 shown in FIGS. 3 and 18 are narrowed down sequentially, based on the part attribute names, "material", "part kind", "use applications", the attribute names, "PVC", "cable", "for communication", to give result shown in FIGS. 22 and 23, and the step returns to processing of S30 (S110).

After that, the already inspected parts categorizing unit 313 categorizes the part attribute information 210 and the part chemical substance information 211 shown in FIGS. 22 and 23, based on the remaining part attribute name, "manufacturer", and the attribute value, "A company", resulting in those shown in FIGS. 24 and 25, respectively (S30).

Next, the material content rate statistic value calculating unit 314 calculates the statistic value of the chemical substance content rate of the parts in each of the group A and the group B categorized in the above, and stores them in the memory unit 310 (S40). In this time, calculation of the average value of the chemical substance content rate in every parts group, as for the part chemical substance information shown in FIG. 25, gives the result as shown in FIG. 26, and Ra=550 (ppm) and Rb=630 (ppm) for the material ID, "CAS01".

And, the parts category candidate judging unit 315 compares an absolute value of difference between Ra and Rb with the parts category judgment standard Δx stored in the memory unit 310 (S50), and when the Δx is smaller, adds the relevant attribute information to the parts category specification candidate list (S60). Here, as for the material ID, "CAS01", shown in FIG. 26, because of |Ra−Rb|=80 (ppm)≦Δx=100 (ppm), the step proceeds to processing of S70, without carrying out processing of S60. In this time, because the processing of S30 to S60 has been carried out by the whole attributes of S10, the step proceeds to S80 (S70), and because the part attribute information is not present in the parts category specification candidate list, the step proceeds to processing of S120 (S80).

And, the parts category specifying unit 316 judges whether the attribute information is present or not in the parts category specification information 220, and when it is absent, the step proceeds to processing of S130 (S120). In this time, because the attribute information of the first to the fourth records of FIG. 5 is present in the processing hitherto, processing of S130 is skipped, and the step proceeds to processing of S140.

After that, the similar parts extracting unit 317 extracts information of the parts already inspected, which is coincident with the whole part attribute information of the parts category specification information 220, from the part attribute information 210 and the part chemical substance information 211 (S140). Here, narrowing down of the part attribute information 210 and the part chemical substance information 211 shown in FIGS. 3 and 4, based on attribute information of the parts category specification information 220 shown in FIG. 5, gives the result shown in FIGS. 22 and 23.

Next, the part chemical substance content rate estimating unit 318 calculates the statistic value of the chemical substance content rate of the parts already inspected extracted above (S150), Here, in calculating an average value as the above statistic value, the parts having the evaluation subject ID, "1" shown in FIG. 5 is estimated to contain 576.7 (=(600+500+630)/3) ppm of the chemical substance with the material ID, "CAS01", from the part chemical substance information 211 shown in FIG. 23.

In this time, in the case where processing from the above S30 to 150 has not been carried out for the whole evaluation subject IDs, the step returns to processing of S30 (S160) to carry out similar processing for the part attribute of other evaluation subject IDs.

Hereafter, because carrying out of the processing of S30 to 80 for the part attribute having the evaluation subject ID, "2", shown in FIG. 9, results in no-presence of part attribute information in the parts category specification candidate list, the step proceeds to processing of S120. Further, because the parts category specification information 220 is not present as well, the step proceeds to processing of S130 (S120) and the whole part attribute information, having the evaluation subject ID, "2", acquired in S10 as shown in the fifth to the ninth records of FIG. 5, is added to the parts category specification information 220 (S130). And, by carrying out processing of S140 to S150 for the part attribute of the relevant evaluation subject ID, for example, the parts category specification information 220 and the part chemical substance estimation result information 221 shown in FIGS. 5 and 6 are prepared.

After that, because processing of the above S30 to 150 has been carried out for the whole evaluation subject ID, the step proceeds to processing of S170 (S160), and the display controlling unit 319 outputs the statistic value of the chemical substance content rate calculated for each evaluation subject ID in S150, on the input-output unit 100 (S170). Here, for example, the part chemical substance estimation result information 221 shown in FIG. 6 is outputted on the columns corresponding to the part attribute name and the attribute value of each evaluation subject ID, as shown in FIG. 8.

In the present Example, even in the case of delay in collecting the chemical substance information of the parts, it is possible to specify the attribute information of the parts relating to containment possibility of the restriction subject material by utilization of the existing chemical substance information, therefore it is possible to inspect and countermeasure the chemical substance information of the parts preferentially from a material with higher containment possibility of the restriction subject material, and thus reduce countermeasure man-hour to these restrictions.

In the above, in the present Examples, a system for estimating the content rate of the specified chemical substance included in the evaluation subject parts, and a method for the estimation were disclosed. However, it may also be considered that the system for estimating the chemical substance included in the part of the present invention acquires content amount of the chemical substance, in addition to the chemical substance information of the above parts already inspected, instead of the content rate of the above specified chemical substance, and is applied to an application to estimate the content amount of the chemical substance included in the above evaluation subject parts. In addition, it is possible to calculate the content amount of the specified chemical substance from the content rate of the specified chemical substance estimated, as long as information on parts weight or weight of each use location of the parts is retained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An estimation system for chemical substance included in part which is a system for estimating a content rate or a content amount of a specified chemical substance included in a part coming in and going out from an enterprise, characterized by comprising:
   a means for accepting an evaluation subject parts ID, attribute information showing characteristics of said parts, and judgment standards of parts category, from a user;
   a means for acquiring attribute information relating to a part already inspected, and chemical substance information on the relevant parts from an external system or a memory unit;
   a means for categorizing the attribute information and the chemical substance information of said parts already inspected to a part group having one attribute information specified of said evaluation subject parts accepted, and a part group not having it;
   a means for calculating a statistic value of the content rate of a specified chemical substance specified by the chemical substance information of said parts already inspected, in each of said parts groups;
   a means for carrying out, comparison between difference of the relevant statistic value in each of said parts groups and said judgment standards of the parts category, adoption of said attribute information specified as a part category specification candidate, in the case where the difference of the relevant statistic value is larger than said judgment standards of the parts category, along with categorization of each of said parts groups, calculation of said statistic value, comparison with the judgment standards and addition of the attribute information to a part category specification candidate list, for all of the attribute information of said evaluation subject parts accepted;
   a means for carrying out, adoption of one having the maximum difference of said statistic value as the parts category specification information, among part attributes of said parts category specification candidate list, along with
   narrow down of the attribute information and the chemical substance information of said parts already inspected, based on the attribute information of said parts category specification information, categorization of each of said parts groups, calculation of said statistic value, comparison with the judgment standards, addition of the attribute information to the parts category specification candidate list, and addition of the parts category specification information, for all of the attribute information of said evaluation subject parts;
   a means for extracting attribute information and chemical substance information of said parts already inspected, coincident with all of attribute information of said parts category specification information;
   a means for calculating the statistic value of the content rate of said specified chemical substance, in the parts already inspected which were extracted in the above; and
   a means for displaying said calculation result on a display device, corresponding to every composing material of the evaluation subject parts.

2. The system for estimating the chemical substance included in the part according to claim 1, characterized by accepting at least one among kind, manufacturer, use applications, use location of the composing material and material kind of the relevant parts, as said attribute information of the parts acquired from an external system and/or a memory unit via an input-output unit, from a user.

3. The system for estimating the chemical substance included in the part according to claim 1, characterized by using at least one among average value, maximum value, minimum value, median, variance and standard deviation, as the statistic value of the content rate of said specified chemical substance in each of said parts groups.

4. The system for estimating the chemical substance included in the part according to claim 1, characterized by further comprising a means for adding all of the attribute information of the evaluation subject parts, to the parts category specification information, in the case where any one of the attribute information is not listed up in said parts category specification information of said evaluation subject parts.

5. The system for estimating the chemical substance included in the part according to claim 1, characterized in that at least one or more data items of said composing material of the attribute information of said evaluation subject parts, which are accepted from a user, are present, and the statistic value of the content rate of said specified chemical substance in said parts already inspected is calculated for every evaluation subject ID, by putting the evaluation subject ID to every data item of each composing material.

6. The system for estimating the chemical substance included in the part according to claim 1, characterized by estimating the content amount of the chemical substance included in the above evaluation subject parts, by acquiring the content amount of the chemical substance in addition to said chemical substance information of said parts already inspected, instead of the content rate of said specified chemical substance.

7. The system for estimating the chemical substance included in the part according to claim 3, characterized by estimating the content amount of the chemical substance included in the above evaluation subject parts, by acquiring the content amount of the chemical substance in addition to said chemical substance information of said parts already inspected, instead of the content rate of said specified chemical substance.

8. The system for estimating the chemical substance included in the part according to claim 5, characterized by estimating the content amount of the chemical substance included in the above evaluation subject parts, by acquiring the content amount of the chemical substance in addition to said chemical substance information of said parts already inspected, instead of the content rate of said specified chemical substance.

\* \* \* \* \*